(12) United States Patent
Hong

(10) Patent No.: US 7,757,360 B1
(45) Date of Patent: Jul. 20, 2010

(54) SAFETY HOOK

(76) Inventor: Rong-Der Hong, No. 39, 33rd Road, Taichung Industrial Park, Situn District, Taichung City (TW)

( * ) Notice: Subject to any disclaimer, the term of this patent is extended or adjusted under 35 U.S.C. 154(b) by 0 days.

(21) Appl. No.: 12/398,588

(22) Filed: Mar. 5, 2009

(30) Foreign Application Priority Data

Dec. 25, 2008 (TW) .............................. 97223285 U

(51) Int. Cl.
*F16B 45/02* (2006.01)
(52) U.S. Cl. .................. 24/600.1; 294/82.2; 294/82.19; 24/599.5; 24/599.7
(58) Field of Classification Search ................ 24/599.5, 24/599.9, 600.1, 601.1, 600.8; 294/82.2, 294/82.19
See application file for complete search history.

(56) References Cited

U.S. PATENT DOCUMENTS

| | | | | |
|---|---|---|---|---|
| 1,949,608 A | * | 3/1934 | Johnson | ..................... 24/599.5 |
| 6,283,524 B1 | * | 9/2001 | Simond | ..................... 294/82.2 |
| 7,437,806 B2 | * | 10/2008 | Lin | ............................ 24/599.5 |
| 2008/0174130 A1 | * | 7/2008 | Lin | ............................ 294/82.2 |
| 2009/0049663 A1 | * | 2/2009 | Hong | ........................ 24/600.1 |

* cited by examiner

*Primary Examiner*—Victor Batson
*Assistant Examiner*—Michael Lee
(74) *Attorney, Agent, or Firm*—Frommer Lawrence & Haug LLP; Ronald R. Santucci

(57) ABSTRACT

A safety hook includes a hook body, a pivotable safety retainer biased to a locking position, and a pivotable latch member biased to abut against a distal end of a hook portion of the hook body to thereby close a hook mouth defined by the hook body. The safety retainer includes a stop portion and an abutment face unit. When the safety retainer is disposed in the locking position, the stop portion abuts against the latch member, and the abutment face unit is adjacent to and spaced apart from a stop block of the hook body. In the locking position, if an external force is applied to pivot the latch member away from the distal end of the hook portion, the abutment face unit will come into contact with the stop block to prevent further pivoting movement of the latch member.

2 Claims, 6 Drawing Sheets

SAFETY HOOK

CROSS-REFERENCE TO RELATED APPLICATION

This application claims priority of Taiwanese Application No. 097223285, filed on Dec. 25, 2008, the disclosure of which is incorporated herein by reference.

BACKGROUND OF THE INVENTION

1. Field of the Invention

This invention relates to a hanging hook, and more particularly to a safety hook for hanging a heavy load.

2. Description of the Related Art

Referring to FIG. 1, a conventional safety hook for hanging a heavy load includes a hook body 1 defining a hook mouth 101, a safety retainer unit 2, and a latch unit 3. The safety retainer unit 2 includes a safety retainer 201 pivotable between a locking position and a release position, and a first torsion spring 202 for biasing the safety retainer 201 toward the locking position. The safety retainer 201 has a pivot portion 203 disposed pivotally on the hook body 1, a stop portion 204 in the form of a rod, and an operating portion 205. The latch unit 3 includes a latch member 301 disposed pivotally on the hook body 1, and a second torsion spring 302 for biasing the latch member 301 to close the hook mouth 101. The latch member 301 has a limiting portion 303.

When no external force is applied to the safety retainer 201 and the latch member 301, the safety retainer 201 is disposed in the locking position, and the hook mouth 101 is closed by the latch member 301 such that the stop portion 204 of the safety retainer 201 is in contact with the limiting portion 303 of the latch member 301. In this state, due to contact between the stop portion 204 and the limiting portion 303, a resistance is provided to prevent pivoting movement of the latch member 301. When it is desired to open the hook mouth 101, the operating portion 205 of the safety retainer 201 is pressed inwardly in a direction (A) to remove the stop portion 204 from the limiting portion 303, thereby allowing for pivoting movement of the latch member 301 relative to the hook body 1.

The aforesaid conventional safety hook has a drawback. That is, when a greater external force is applied to pivot the latch member 301 to thereby result in impact of the stop portion 204 on the hook body 1, the stop portion 204 may be broken. This poses safety risks during use.

SUMMARY OF THE INVENTION

The object of this invention is to provide a safety hook that has enhanced safety features.

According to this invention, a safety hook includes a hook body, a pivotable safety retainer biased to a locking position, and a pivotable latch member biased to abut against a distal end of a hook portion of the hook body to thereby close a hook mouth defined by the hook body. The safety retainer includes a stop portion and an abutment face unit. When the safety retainer is disposed in the locking position, the stop portion abuts against the latch member, and the abutment face unit is adjacent to and spaced apart from a stop block of the hook body. In the locking position, if an external force is applied to pivot the latch member away from the distal end of the hook portion, the abutment face unit will come into contact with the stop block to prevent further pivoting movement of the latch member.

As such, impact of the stop portion of the safety retainer on the hook body can be prevented due to the presence of the stop block and the abutment face unit.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
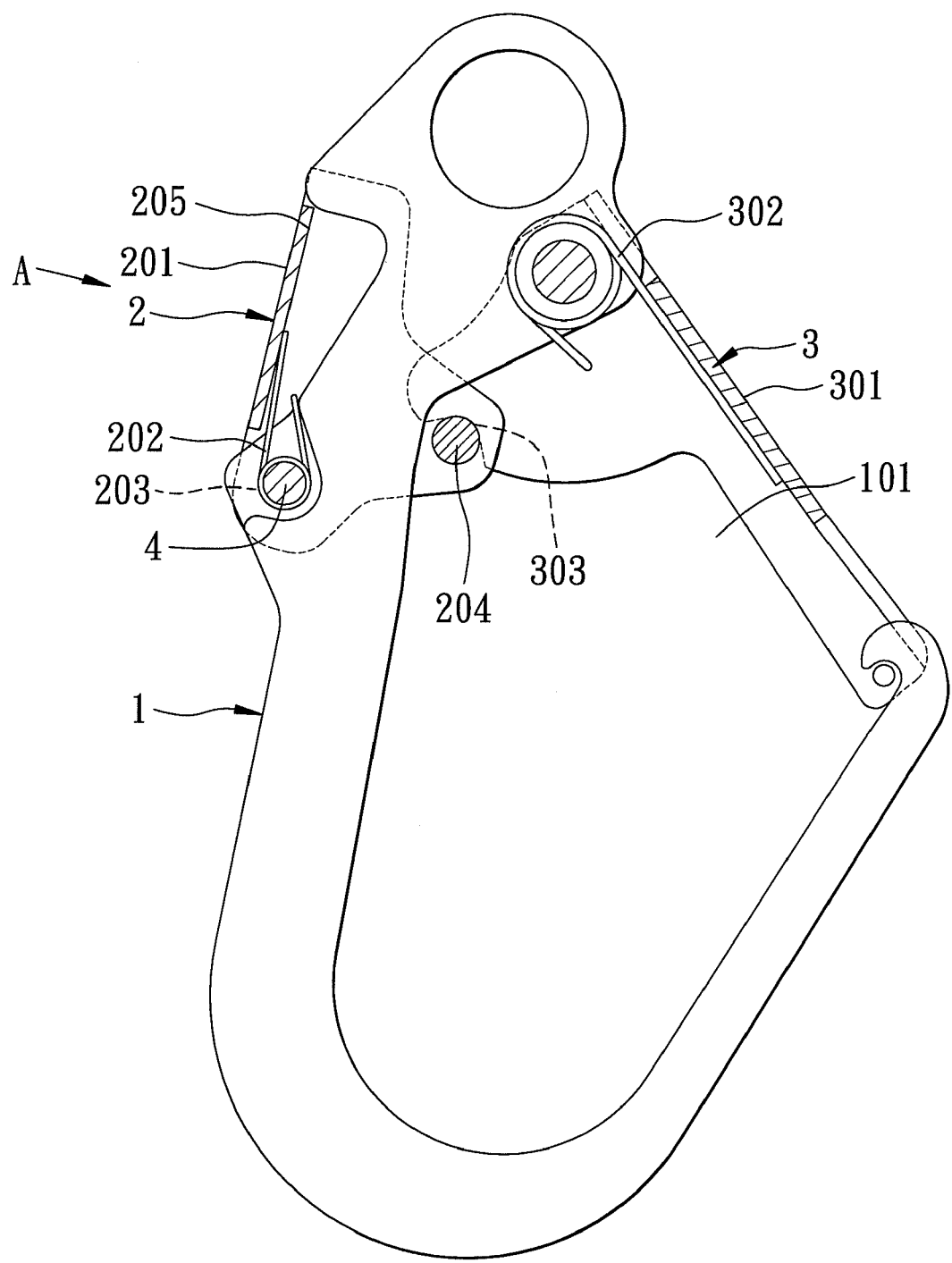
FIG. 1 is a partly sectional side view of a conventional safety hook.
Figure 2:
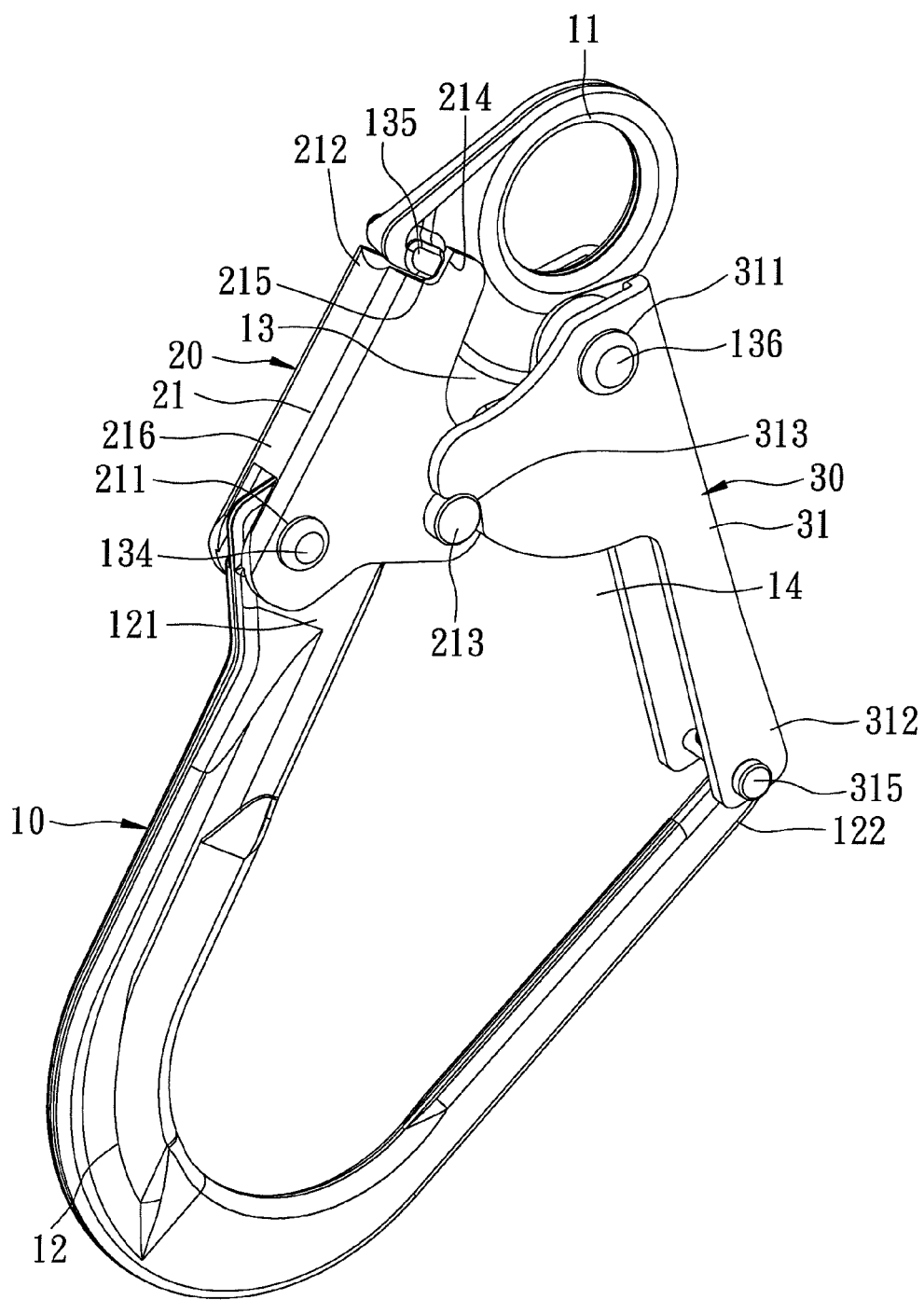
FIG. 2 is a perspective view of the preferred embodiment of a safety hook according to this invention.
Figure 3:
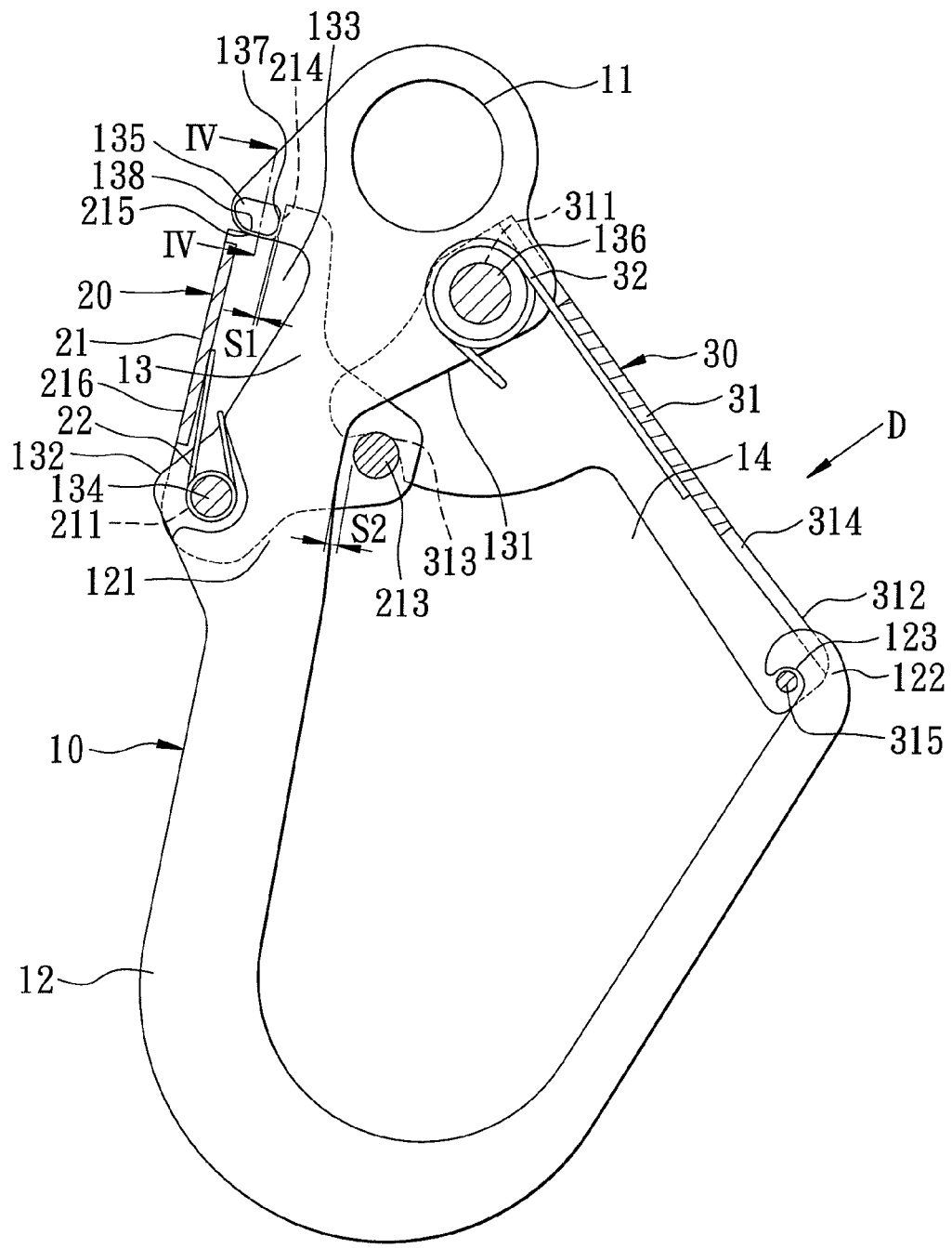
FIG. 3 is a partly sectional side view of the preferred embodiment when a safety retainer and a latch member are disposed respectively in a locking position and a mouth-closing position.

Referring to FIGS. 2 and 3, the preferred embodiment of a safety hook according to this invention includes a hook body 10, a safety retainer unit 20, and a latch unit 30.

Figure 4:
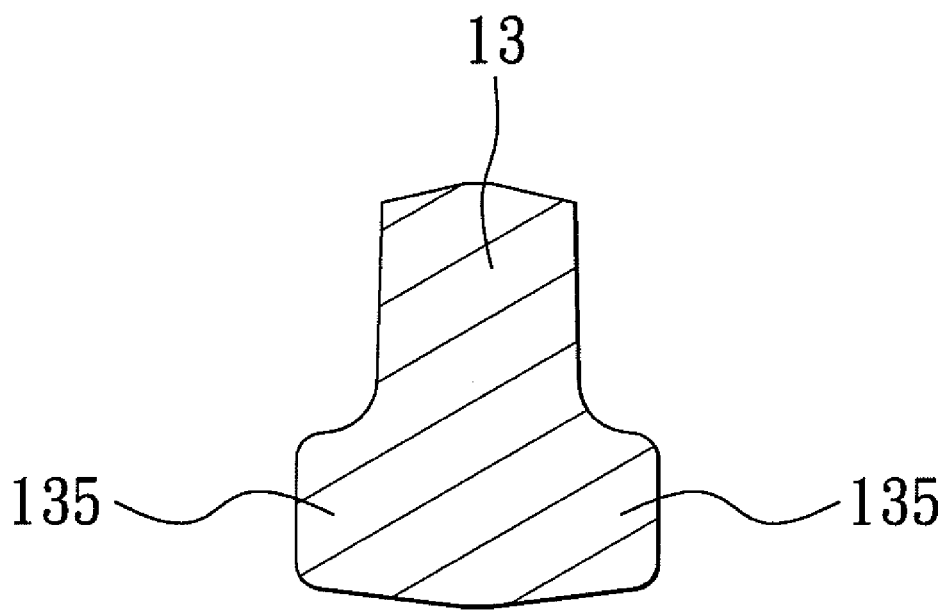
FIG. 4 is a sectional view taken along line IV-IV in FIG. 3.

The hook body 10 has a positioning ring portion 11, a hook portion 12 opposite to the positioning ring portion 11, and a connecting section 13 connected between the positioning ring portion 11 and the hook portion 12. The hook portion 12 is U-shaped, and has a proximate end 121 connected to the connecting section 13, and a distal end 122 opposite to the proximate end 121. The distal end 122 cooperates with the positioning ring portion 11 to define a hook mouth 14 therebetween, and is curved in a known manner to define a retaining groove 123. The connecting section 13 has an inner side 131, an outer side 132 that is opposite to the inner side 131 and that is farther from the hook mouth 14 than the inner side 131, and a recess 133 disposed in the outer side 132. A first pivot 134 is disposed on the connecting section 13 of the hook body 10, and is connected to the safety retainer unit 20. The connecting section 13 is formed integrally with two aligned stop blocks 135 disposed adjacent to the outer side 132. Each of the stop blocks 135 has an adjacent pair of first and second side surfaces 137, 138. A second pivot 136 is disposed on the connecting section 13 of the hook body 10, and is connected to the latch unit 30. With further reference to FIG. 4, the stop blocks 135 extend respectively and integrally from two opposite sides of the connecting section 13 away from each other.

The safety retainer unit 20 includes a safety retainer 21 and a first resilient member 22. The safety retainer 21 has a pivot end 211 disposed pivotally on the connecting section 13, an free end 212 opposite to the pivot end 211, a stop portion 213 in the form of a rod having a circular cross-section, two abutment face units disposed at the free end 212 and each consisting of a pair of first and second faces 214, 215 generally perpendicular to each other, and an operation plate portion 216 pivotable in the recess 133 between a non-pressed position shown in FIG. 3 and a pressed position shown in FIG. 6. The abutment face units are biased by the first resilient member 22 toward the stop blocks 135, respectively. The safety retainer 21 is pivotable relative to the hook body 10 between a locking position shown in FIG. 3 whereat the operation plate portion 216 is disposed in the non-pressed position, and a release position shown in FIG. 6 whereat the operation plate portion 216 is disposed in the pressed position. When the safety retainer 21 is disposed in the locking position, the first and second faces 214, 215 confront respectively the first and second side surfaces 137, 138 of the stop blocks 135.

Figure 5:
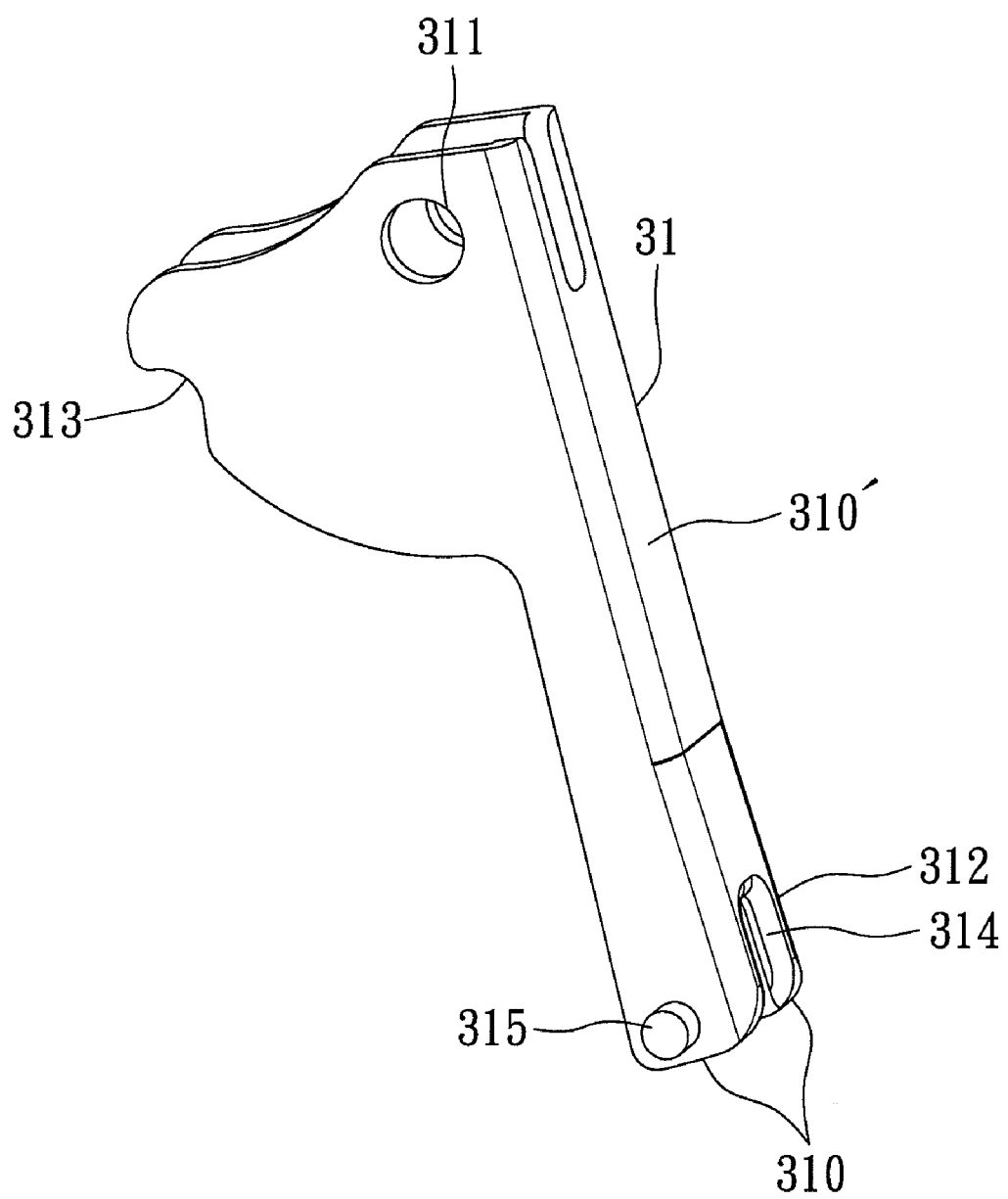
FIG. 5 is a perspective view of the latch member of the preferred embodiment.

The latch unit 30 includes a latch member 31 and a second resilient member 32. With further reference to FIG. 5, the latch member 31 has two sidewalls 310, a connecting wall 310' interconnecting the side walls 310, a pivot end 311 disposed pivotally on the connecting section 13 of the hook body 10, and a free end 312 opposite to the pivot end 311. Each of the sidewalls 310 has a limiting portion 313 configured as a curved groove. The connecting wall 310' has an end formed with an open-ended slot 314. An engaging rod 315 extends through the sidewalls 310, and is aligned with the open-ended slot 314. The latch member 31 is pivotable relative to the hook body 10 between a mouth-closing position shown in FIG. 3 whereat the free end 312 of the latch member 31 abuts against the distal end 122 of the hook portion 12 of the hook body 10 to close the hook mouth 14, and a mouth-opening position shown in FIG. 6 whereat the free end 312 of the latch member 31 is removed from the distal end 122 of the hook portion 12 of the hook body 10 to open the hook mouth 14. When the latch member 31 is disposed in the mouth-closing position, the distal end 122 of the hook body 12 extends through the open-ended slot 314 in the latch member 31 to engage the engaging rod 315 with the retaining groove 123. The second resilient member 32 biases the latch member 31 to rotate counterclockwise about the second pivot 136 toward the mouth-closing position.

With particular reference to FIGS. 2 and 3, when no external force is applied to the safety retainer 21 and the latch member 31, the operation plate portion 216 of the safety retainer 21 is biased to rotate counterclockwise about the first pivot 134 to the no-pressed position so that the safety retainer 21 is biased to the locking position, and the latch member 31 is biased to the mouth-closing position. In this state, the stop portion 213 of the safety retainer 21 abuts against the limiting portion 313 of the latch member 31 to prevent pivoting movement of the latch member 31 (i.e., removal of the free end 312 of the latch member 31 from the distal end 122 of the hook portion 12 of the hook body 10).

Figure 6:
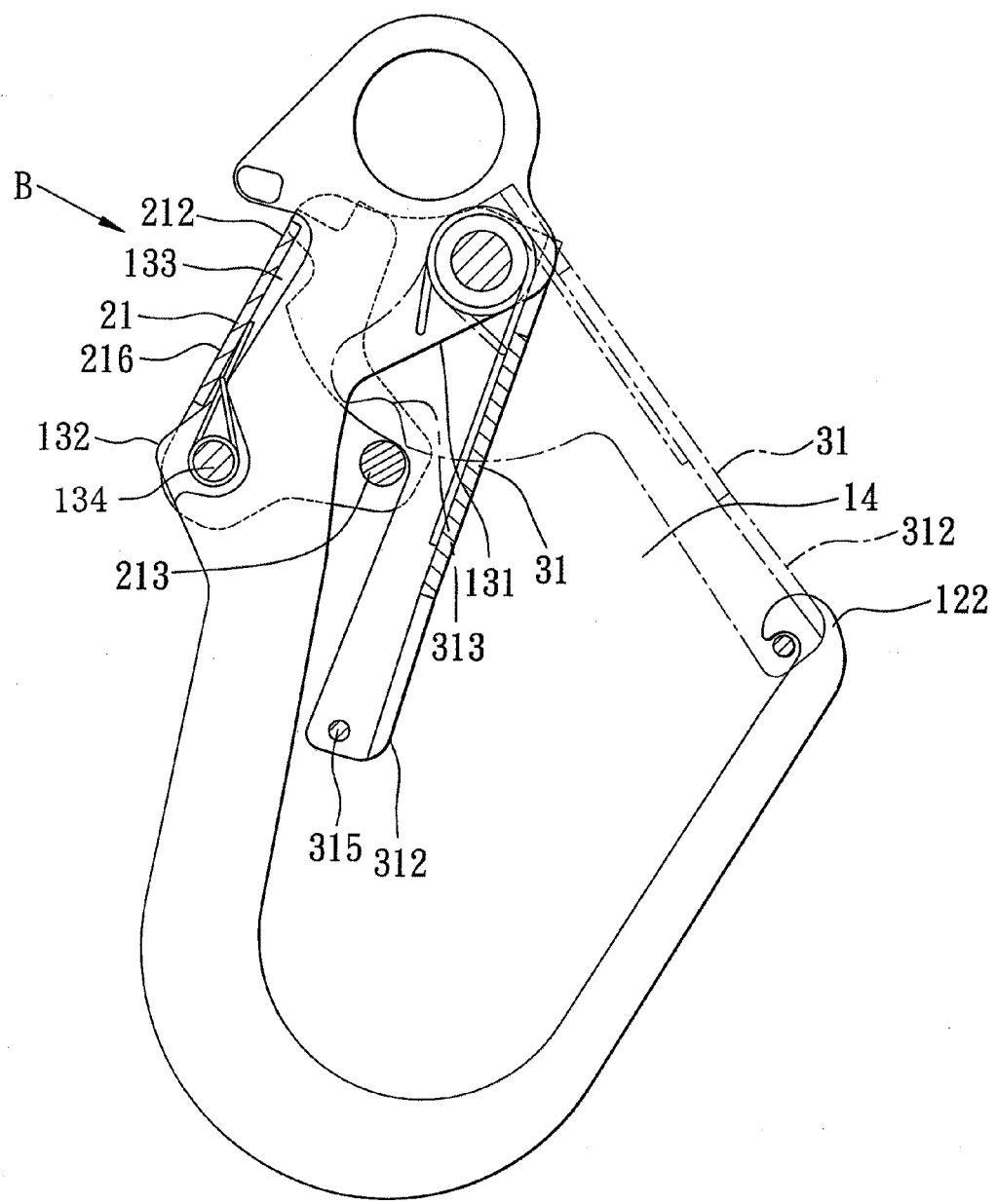
FIG. 6 is a partly sectional view of the preferred embodiment when the safety retainer and the latch member are disposed respectively in a release position and a mouth-opening position.

With particular reference to FIG. 6, when it is desired to hang a heavy load (not shown) on the safety hook, the operation plate portion 216 of the safety retainer 21 is pressed inwardly in a direction (B) to the pressed position to thereby rotate the safety retainer 21 clockwise about the first pivot 314 to the release position. Hence, the stop portion 213 is removed from the limiting portion 313 so that the latch member 31 can be pivoted manually to the mouth-opening position.

With particular reference to FIG. 3, when the latch member 31 is disposed in the mouth-closing position, and when the safety retainer 21 is disposed in the locking position, each of the abutment faces consisting of the first and second faces 214, 215 of the safety retainer 21 is adjacent to and spaced apart from the corresponding stop block 135 by a small distance (S1), and the stop portion 213 of the safety retainer 21 is spaced apart from the inner side 131 of the connecting section 13 of the hook body 10 by a large distance (S2) that is larger than the small distance (S1). As such, if a greater external force is applied to the latch member 31 in a direction (D) to rotate the same clockwise so that the safety retainer 21 rotates counterclockwise, the abutment face units will come into contact with the stop blocks 135, respectively, and impact of the stop portion 213 of the safety retainer 21 on the inner side 131 of the connecting section 13 can be prevented. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A safety hook comprising:
a hook body having a positioning ring portion, a hook portion opposite to said positioning ring portion, and a connecting section connected between said positioning ring portion and said hook portion, said hook portion being U-shaped and having a distal end cooperating with said positioning ring portion to define a hook mouth therebetween, said connecting section having an inner side and an outer side opposite to said inner side and farther from said hook mouth than said inner side, said connecting section being formed integrally with at least one stop block disposed adjacent to said outer side;
a safety retainer unit including a safety retainer and a first resilient member, said safety retainer having a pivot end disposed pivotally on said connecting section, at least one abutment face unit disposed at an end of said safety retainer opposite to said pivot end of said safety retainer and biased toward said stop block by said first resilient member, and a stop portion, said safety retainer being biased by said first resilient member to a locking position such that said abutment face unit is adjacent to and spaced apart from said stop block by a small distance, said safety retainer being pivotable against biasing action of said first resilient member to a release position to thereby move said abutment face unit away from said stop block, said stop portion of said safety retainer being spaced apart from said inner side of said connecting section by a large distance larger than said small distance when said safety retainer is disposed in said locking position so as to allow for engagement of said abutment face unit with said stop block while preventing engagement of said stop portion and said inner side of said connecting section of said hook body during pivoting movement of said safety retainer relative to said hook body; and
a latch unit including a latch member having a pivot end disposed pivotally on said connecting section and a free end, and a second resilient member for biasing said free end of said latch member to abut against said distal end of said hook portion, said latch member further having at least one limiting portion abutting against said stop portion of said safety retainer to thereby prevent removal of said free end of said latch member from said distal end of said hook portion when said safety retainer is disposed in said locking position, said stop portion of said safety retainer being removed from said limiting portion of said latch member so that removal of said free end of said latch member from said distal end of said hook portion is allowed when said safety retainer is disposed in said release position;
wherein, when said safety retainer is disposed in said locking position, upon application of an external force to said latch member, said limiting portion of said latch member pivots said stop portion of said safety retainer, thereby allowing said abutment face unit of said safety retainer to pivot through said small distance and come into contact.

2. The safety hook as claimed in claim 1, wherein said abutment face unit of said safety retainer has a pair of first and second faces generally perpendicular to each other, said stop block having two side surfaces confronting respectively said first and second faces of said safety retainer when said safety retainer is disposed in said locking position such that said free end of said latch member is pivotable away from said distal end of said hook portion as a result of application of the external force to said latch member, so that said limiting portion of said latch member pivots said stop portion of said safety retainer, thereby allowing said first and second faces of said abutment face unit of said safety retainer to come into contact with said side surfaces of said stop block, respectively.

* * * * *